(12) United States Patent
Buzaglo

(10) Patent No.: US 11,047,807 B2
(45) Date of Patent: Jun. 29, 2021

(54) DEFECT DETECTION

(71) Applicant: CAMTEK Ltd., Migdal-Haemek (IL)

(72) Inventor: Daniel Buzaglo, Migdal Haemeq (IL)

(73) Assignee: CAMTEK LTD., Migdal-Haemek (IL)

( * ) Notice: Subject to any disclaimer, the term of this patent is extended or adjusted under 35 U.S.C. 154(b) by 0 days.

(21) Appl. No.: 16/829,118

(22) Filed: Mar. 25, 2020

(65) Prior Publication Data
US 2020/0309718 A1 Oct. 1, 2020

Related U.S. Application Data

(60) Provisional application No. 62/822,998, filed on Mar. 25, 2019.

(51) Int. Cl.
*G01N 21/95* (2006.01)
*G06T 9/00* (2006.01)
*G06T 15/00* (2011.01)
*G06N 3/02* (2006.01)

(52) U.S. Cl.
CPC .......... *G01N 21/9505* (2013.01); *G06N 3/02* (2013.01); *G06T 9/002* (2013.01); *G06T 15/005* (2013.01)

(58) Field of Classification Search
CPC ........ G06N 3/02; G06N 3/0454; G06T 9/002; G06T 7/0004; G01N 21/9505
USPC ........................................ 356/237.2
See application file for complete search history.

(56) References Cited

U.S. PATENT DOCUMENTS

| | | | |
|---|---|---|---|
| 2017/0351952 A1* | 12/2017 | Zhang ................. | G06N 3/0454 |
| 2018/0103247 A1* | 4/2018 | Kolchin ............... | G06T 7/0004 |
| 2018/0149603 A1* | 5/2018 | Bhattacharyya ... | G01N 21/9505 |
| 2019/0362486 A1* | 11/2019 | Diao .................... | G06K 9/6212 |

* cited by examiner

*Primary Examiner* — Hung Nguyen
(74) *Attorney, Agent, or Firm* — Reches Patent

(57) ABSTRACT

There may be provided a method for determining three dimensional (3D) defect information, the method may include performing a two-dimensional (2D) inspection of an area of a wafer to generate 2D defect information related to defects of the area of the wafer; estimating 3D defect information regarding the defects of the area of the wafer, wherein the estimating is based on the 2D defect information related to defects of the area of the wafer, and a mapping between 2D defect information and 3D defect information, wherein the mapping is generated using a supervised deep learning machine process.

23 Claims, 4 Drawing Sheets

410

420

430

400

FIG. 4

DEFECT DETECTION

CROSS-REFERENCE

This application claims priority from U.S. provisional patent Ser. No. 62/822,998 filing date Mar. 25, 2019.

BACKGROUND

Wafers are manufactured by a applying a highly complex and error prone process. Microscopic scale defects may include defects that do not affect the functionality of the wafer, killer defects and defects that may have a limited effect on the wafer, and the like.

Some defects may be easily detected using solely two dimensional (2D) inspection while other defects can be detected by using three dimensional (3D) inspection.

The extraction of the 3D information is time consuming—especially when applying a highly accurate height determination process such as a confocal chromatic sensing.

There is a growing need to provide a fast method for receiving 3D information of defects.

SUMMARY

There may be provided a method for determining three dimensional (3D) defect information, the method may include performing a two-dimensional (2D) inspection of an area of a wafer to generate 2D defect information related to defects of the area of the wafer; estimating 3D defect information regarding the defects of the area of the wafer, wherein the estimating is based on (a) the 2D defect information related to defects of the area of the wafer, and (b) a mapping between 2D defect information and 3D defect information, wherein the mapping is generated using a supervised deep learning machine process.

There may be provided a non-transitory computer readable medium for determining three dimensional (3D) defect information, the non-transitory computer readable medium stores instructions for performing a two-dimensional (2D) inspection of an area of a wafer to generate 2D defect information related to defects of the area of the wafer; estimating 3D defect information regarding the defects of the area of the wafer, wherein the estimating is based on (a) the 2D defect information related to defects of the area of the wafer, and (b) a mapping between 2D defect information and 3D defect information, wherein the mapping is generated using a supervised deep learning machine process.

There may be provided an inspection system for determining three dimensional (3D) defect information, the inspection system may include a two-dimensional (2D) inspection unit that is configured to perform a 2D inspection of an area of a wafer to generate 2D defect information related to defects of the area of the wafer; a processor that is configured to estimate 3D defect information regarding the defects of the area of the wafer, wherein the estimating is based on (a) the 2D defect information related to defects of the area of the wafer, and (b) a mapping between 2D defect information and 3D defect information, wherein the mapping is generated using a supervised deep learning machine process.

BRIEF DESCRIPTION OF THE INVENTION

Figure 1:
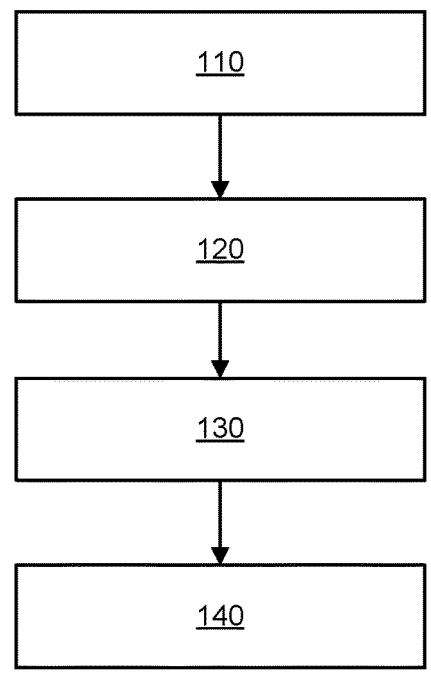
Figure 2:
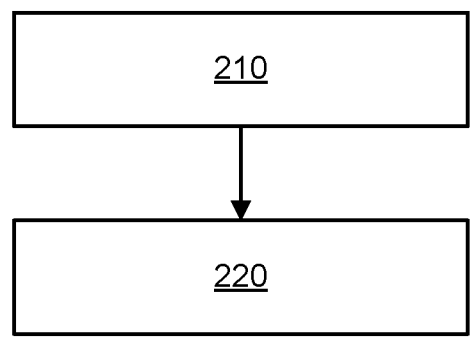
Figure 3:
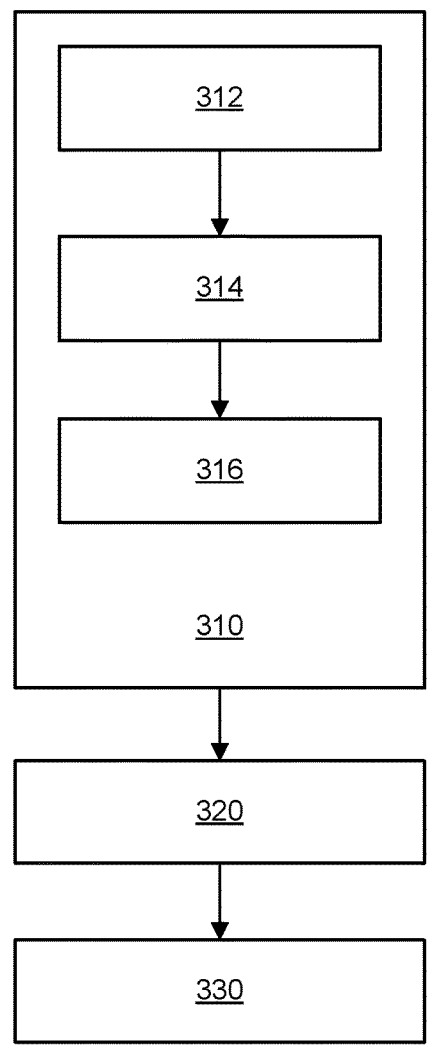

The present invention will be understood and appreciated more fully from the following detailed description taken in conjunction with the drawings, in which:

FIG. 1 is an example of a method;
FIG. 2 is an example of a method;
FIG. 3 is an example of a method; and
FIG. 4 is an example of an inspection system.

DETAILED DESCRIPTION OF THE INVENTION

Because the apparatus implementing the present invention is, for the most part, composed of optical components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

There is provided a method and a system for mapping between 3D defect information and 2D defect information and for generating 3D defect information based on said mapping.

The mapping between 3D defect information and 2D defect information may be generated by performing 2D inspection (that provides 2D information) and 3D inspection (that provides 3D information) on the same wafers, and performing a supervised machine learning process that uses as input the 2D information, and uses the 3D information as the desired output of the machine learning process.

The machine learning process may use a deep learning. The deep learning may be fed, during the learning process, with the 2D information as input and the 3D information may be used as the desired output. The difference between the output of the deep learning and the 3D information may be calculated by an error unit and may be backpropagated through the deep learning- or be used in any other manner to adjust the model represented by the deep learning.

Deep learning (see www.wikipedia.org) (also known as deep structured learning or differential programming) is part of a broader family of machine learning methods based on artificial neural networks with representation learning. Learning can be supervised, semi-supervised or unsupervised.

Deep learning architectures such as deep neural networks, deep belief networks, recurrent neural networks and convolutional neural networks have been applied to fields including computer vision, speech recognition, natural language processing, audio recognition, social network filtering, machine translation, bioinformatics, drug design, medical image analysis, material inspection and board game programs, where they have produced results comparable to and in some cases surpassing human expert performance.

Artificial neural networks (ANNs) were inspired by information processing and distributed communication nodes in biological systems. ANNs have various differences from biological brains. Specifically, neural networks tend to be static and symbolic, while the biological brain of most living organisms is dynamic (plastic) and analog.

The deep machine learning process may be or may include a deep learning process.

The 3D inspection may be applied on defects that were found using the 2D inspection—thereby shortening the training process.

The 2D inspection may involve applying one or more inspection modes, illuminating the wafer with one or more beams of different radiations, and the like.

Any of the methods may be applied on various types of wafers—such as a base wafer or a patterned wafer. The 3D information of defects of a bare wafer can be learnt using a time consuming process such as confocal chromatic sensing (CCS) and the mapping between 2D and 3D defect information may enable to speed the defect detection process by saving the need to perform the CCS process during an inference phase and/or after the learning phase.

FIG. 1 illustrates method 100. Method 100 may include, for example, the following steps.

For each wafer of a group of wafers inspected during the training process:
  a. Perform 2D inspection that may involve illuminating the wafer with one or more beams of radiation—for example infrared and visual light and extract the defects location, size and image. (Step 110). Any sensors and/or illumination and/or collection and/or any optics may be used to obtain the 2D defect information.
  b. For each defect—determine the defect location and boundaries. (Step 120)
  c. Run 3D inspection on the boundaries of the defect and record the defect height profile (maximal height or height distribution). (Step 130).
  d. Run a deep learning machine process. The input of the deep learning machine process will the 2D information (for example—one or more defect images (for example image parts that includes only defects) acquired during step a), and the output (label) is the height information. The height information may be associated with a bin out of multiple bins. The binning may be determined in any manner—for example based on a height region of interest provided by the client). (Step 140).
  e. The deep learning machine process may provide the mapping. If multiple models are provided—the determination of the best model will be performed by a machine learning expert at the end of the cycle.

FIG. 2 illustrates method 200. Method 200 may be executed after the mapping (model) is provided—the detection of defects may include:
  a. Perform 2D inspection that may involve illuminating the wafer with one or more beams of radiation—for example infrared and visual light and extract the defects location, size and image. (Step 210). Any sensors and/or illumination and/or collection and/or any optics may be used to obtain the 2D defect information.
  b. Applying the mapping (feeding the trailed machine learning process) on the outcome of step 210. (Step 220).

The inspection may use one or more detectors such as any kind of camera—CCD, Area cameras, Line, TDI, ICI, Array, Black and White camera or color camera, etc.

The inspection may use illumination means can be any source of electromagnetic radiation such as flash light, constant light, UV, IR, laser, fiber, LED, Xenon, Strobe light, etc.

FIG. 3 illustrates method 300.

Method 300 be a method for determining three dimensional (3D) defect information.

Method 300 may start by step 310 of receiving or generating a mapping between 2D defect information and 3D defect information. The mapping is generated using a supervised deep learning machine process.

Step 310 may be followed by step 320 of performing a two-dimensional (2D) inspection of an area of a wafer to generate 2D defect information related to defects of the area of the wafer.

Step 320 may be followed by step 330 of estimating 3D defect information regarding the defects of the area of the wafer, wherein the estimating is based on (a) the 2D defect information related to defects of the area of the wafer, and (b) a mapping between 2D defect information and 3D defect information, wherein the mapping is generated using a supervised deep learning machine process.

Step 310 may include generating the mapping.

Step 310 may include a sequence of steps that include steps 312, 314 and 316.

Step 312 may include performing a 2D inspection of at least a portion of at least one wafer, to provide 2D inspection results.

Step 312 may include using at least one sensor selected out of a charged coupled device (CCD) sensor, an area cameras, an inner crack imaging (ICI) camera a line camera (for example the ICI camera of Camtek Ltd, Israel), time delay and integration (TDI) sensor, a sensor that includes an array of sensing elements, a black and white camera, a color camera.

In an example the 2D defect information was obtained by an ICI camera and yet additional 2D defect information was acquired by a black and white camera that is not an ICI camera.

The 2D inspection results of step 312 may be defect location and boundaries.

Step 312 may include illuminating at least a portion of the at least one wafer with infrared and visual light beams.

Step 314 may include performing a 3D inspection of the at least portion of the at least one wafer, to provide 3D inspection results.

The 3D inspection may involve CCS—for example using the method of U.S. Pat. No. 8,363,229 or of U.S. Pat. No. 9,756,313—or any other type of 3D inspection.

Step 314 may include measuring 3D information at the areas surrounded by the boundaries of the defects—or measuring the 3D information only at the defects and their vicinity, or measuring the 3D information only of the defects.

The 3D inspection results may be any height attribute—for example a height distributions of at least the boundaries of the defects.

The 3D information results may be provided at a height bin resolution. Thus the possible height range may be virtually divided to height bins and the 3D information values indicate the best matching height bins.

Step 316 may include performing a supervised deep learning machine process based on the 2D inspection results and on the 3D inspection results, to provide the mapping.

In step 316 the 2D inspection results may be inputs to the supervised deep learning machine process, and the 3D inspection results may be desired outputs of the supervised deep learning machine process.

Step 310 may include selecting a machine learning process model that represents the mapping out of multiple machine learning process models generated during the performing of the supervised deep learning machine process.

Step 310 may be executed in an iterative manner in which during each iteration steps 312, 314 and 316 are applied on one or more wafers. This is followed by evaluating whether the mapping is accurate enough—and if so—the generating of the mapping ends—else—the mapping may be updated based on the outcome of the iteration—and new one or more wafers undergo another iteration.

The evaluating of whether the mapping is accurate enough may be executed by (a) measuring 3D information and 2D information related to a certain wafer, (b) estimating 3D defect information of the certain wafer based on the mapping and the 2D defect information of the wafer—and comparing the estimated 3D information to the measured 3D information and determine that the estimate is accurate enough—the mapping is accurate enough—if the comparison shows that the estimate is close enough (by any pre-defined criteria) to the actual 3D defect information.

Figure 4:
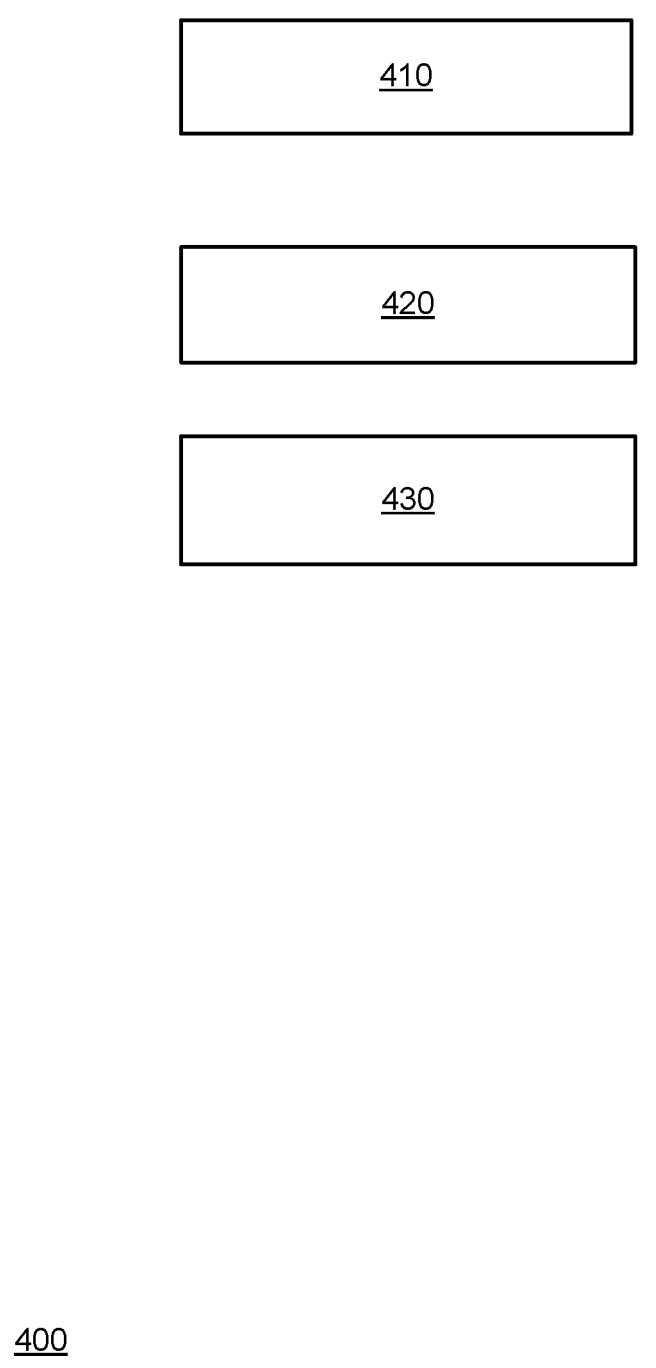

FIG. 4 illustrates inspection system 400 for determining three dimensional (3D) defect information. The inspection system may be an automatic optical inspection (AOI) system.

Inspection system 400 may include a two-dimensional (2D) inspection unit 410 that is configured to perform a 2D inspection of an area of a wafer to generate 2D defect information related to defects of the area of the wafer, and a processor 420 that is configured to estimate 3D defect information regarding the defects of the area of the wafer, wherein the estimating is based on (a) the 2D defect information related to defects of the area of the wafer, and (b) a mapping between 2D defect information and 3D defect information, wherein the mapping is generated using a supervised deep learning machine process.

The processor may include one or more processing circuits.

The inspection system may or may not include a 3D inspection unit and may or may not generate the mapping.

Assuming that the inspection includes 3D inspection unit 430 it may at least participate in the generation of the mapping.

It should be noted that the mapping may be generated by another system—for example by another inspection system.

Assuming that the inspection system 400 generates the mapping then it may be configured to execute method 300.

For example:
a. The 2D inspection unit may be configured to perform a 2D inspection of at least a portion of at least one wafer, to provide 2D inspection results.
b. The 3D inspection unit may be configured to perform a 3D inspection of the at least portion of the at least one wafer, to provide 3D inspection results.
c. The processor may be configured to perform a supervised deep learning machine process based on the 2D inspection results and on the 3D inspection results, to provide the mapping. The 2D inspection results may be inputs to the supervised deep learning machine process. The 3D inspection results may be desired outputs of the supervised deep learning machine process.

The supervised deep learning machine process may be executed, at least in part, by a processor that does not belong to the inspection system.

The 2D inspection unit may include an illumination module, a collection module, and the like. The 2D inspection unit is termed a 2D inspection module because it does not perform, with at least a certain accuracy, height measurements. The 2D inspection unit may be a bright field 2D inspection unit, a dark field 2D inspection unit and the like.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The word "comprising" does not exclude the presence of other elements or steps then those listed in a claim. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe.

Thus, these terms are not necessarily intended to indicate temporal or other prioritization of such elements. The mere fact that certain measures are recited in mutually different claims does not indicate that a combination of these measures cannot be used to advantage.

I claim:

1. A method for determining three dimensional (3D) defect information, the method comprises:
performing a two-dimensional (2D) inspection of an area of a wafer to generate 2D defect information related to defects of the area of the wafer;
estimating 3D defect information regarding the defects of the area of the wafer, wherein the estimating is based on (a) the 2D defect information related to defects of the area of the wafer, and (b) a mapping between 2D defect information and 3D defect information, wherein the mapping is generated using a supervised deep learning machine process.

2. The method according to claim 1, comprising generating the mapping.

3. The method according to claim 2, wherein the generating of the mapping comprises:
performing a 2D inspection of at least a portion of at least one wafer, to provide 2D inspection results;
performing a 3D inspection of the at least portion of the at least one wafer, to provide 3D inspection results; and performing a supervised deep learning machine process based on the 2D inspection results and on the 3D inspection results, to provide the mapping;

wherein the 2D inspection results are inputs to the supervised deep learning machine process; wherein the 3D inspection results are desired outputs of the supervised deep learning machine process.

4. The method according to claim 3 wherein the 2D inspection results are defect location and boundaries; and wherein the 3D inspection comprises measuring 3D information at area located between boundaries of the defects.

5. The method according to claim 4 wherein the 3D inspection results are height distributions of at least the defects.

6. The method according to claim 2 wherein the performing of the 2D inspection of the at least portion of the at least one wafer with infrared and visual light beams.

7. The method according to claim 2 comprising performing the 3D inspection only on defects identified in the 2D inspection results.

8. The method according to claim 2 wherein the 3D information results are provided at a height bin resolution.

9. The method according to claim 2 wherein the performing of the supervised deep learning machine process comprises selecting a machine learning process model that represents the mapping out of multiple machine learning process models generated during the performing of the supervised deep learning machine process.

10. The method according to claim 1 wherein the performing of the 2D inspection comprises using at least one sensor selected out of a charged-coupled device (CCD) sensor, an area cameras, an inner crack imaging (ICI) camera, a line camera, time delay and integration (TDI) sensor, a sensor that includes an array of sensing elements, a black and white camera, a color camera.

11. A non-transitory computer readable medium for determining three dimensional (3D) defect information, (Original) The non-transitory computer readable medium stores instructions for:

performing a two-dimensional (2D) inspection of an area of a wafer to generate 2D defect information related to defects of the area of the wafer;

estimating 3D defect information regarding the defects of the area of the wafer, wherein the estimating is based on (a) the 2D defect information related to defects of the area of the wafer, and (b) a mapping between 2D defect information and 3D defect information, wherein the mapping is generated using a supervised deep learning machine process.

12. The non-transitory computer readable medium according to claim 11, comprising generating the mapping.

13. The non-transitory computer readable medium according to claim 12, wherein the generating of the mapping comprises:

performing a 2D inspection of at least a portion of at least one wafer, to provide 2D inspection results;

performing a 3D inspection of the at least portion of the at least one wafer, to provide 3D inspection results; and performing a supervised deep learning machine process based on the 2D inspection results and on the 3D inspection results, to provide the mapping;

wherein the 2D inspection results are inputs to the supervised deep learning machine process; wherein the 3D inspection results are desired outputs of the supervised deep learning machine process.

14. The non-transitory computer readable medium according to claim 13 wherein the 2D inspection results are defect location and boundaries; and wherein the 3D inspection comprises measuring 3D information at the boundaries of the defects.

15. The non-transitory computer readable medium according to claim 14 wherein the 3D inspection results are height distributions of at least the boundaries of the defects.

16. The non-transitory computer readable medium according to claim 12 wherein the performing of the 2D inspection of the at least portion of the at least one wafer with infrared and visual light beams.

17. The non-transitory computer readable medium according to claim 12 comprising performing the 3D inspection only on defects identified in the 2D inspection results.

18. The non-transitory computer readable medium according to claim 12 wherein the 3D information results are provided at a height bin resolution.

19. The non-transitory computer readable medium according to claim 12 wherein the performing of the supervised deep learning machine process comprises selecting a machine learning process model that represents the mapping out of multiple machine learning process models generated during the performing of the supervised deep learning machine process.

20. An inspection system for determining three dimensional (3D) defect information, the inspection system comprises: a two-dimensional (2D) inspection unit that is configured to perform a 2D inspection of an area of a wafer to generate 2D defect information related to defects of the area of the wafer; a processor that is configured to estimate 3D defect information regarding the defects of the area of the wafer, wherein the estimating is based on (a) the 2D defect information related to defects of the area of the wafer, and (b) a mapping between 2D defect information and 3D defect information, wherein the mapping is generated using a supervised deep learning machine process.

21. The method according to claim 1 wherein the performing of the 2D inspection is executed without height measurement.

22. The non-transitory computer readable medium according to claim 12 wherein the performing of the 2D inspection is executed without height measurement.

23. The inspection system according to claim 20 wherein the 2D inspection unit is configured to perform the 2D inspection of the area of the wafer without height measurement.

* * * * *